(No Model.) 2 Sheets—Sheet 2.

J. ARCHER & N. M. FRAZIER.
HARROW.

No. 544,837. Patented Aug. 20, 1895.

Witnesses
Chas. A. Ford.
H. T. Riley

By their Attorneys.

Inventors
John Archer,
Nevers M. Frazier,

C. A. Snow & Co.

UNITED STATES PATENT OFFICE.

JOHN ARCHER AND NEREUS M. FRAZIER, OF PLAINFIELD, INDIANA.

HARROW.

SPECIFICATION forming part of Letters Patent No. 544,837, dated August 20, 1895.

Application filed July 21, 1894. Serial No. 518,227. (No model.)

*To all whom it may concern:*

Be it known that we, JOHN ARCHER and NEREUS M. FRAZIER, citizens of the United States, residing at Plainfield, in the county of Hendricks and State of Indiana, have invented a new and useful Harrow, of which the following is a specification.

The invention relates to improvements in harrows.

The object of the present invention is to improve the construction of disk-harrows to enable the gangs of rotative soil-working devices to be readily arranged at the desired angle to the line of draft and to cause the rotative soil-working devices to remove automatically all adhering substances to prevent the harrow from becoming clogged.

A further object of the invention is to enable the soil passed over by the harrow to be thoroughly operated on and finely pulverized.

The invention consists in the construction and novel combination and arrangement of parts hereinafter fully described, illustrated in the accompanying drawings, and pointed out in the claim hereto appended.

Figure 1:
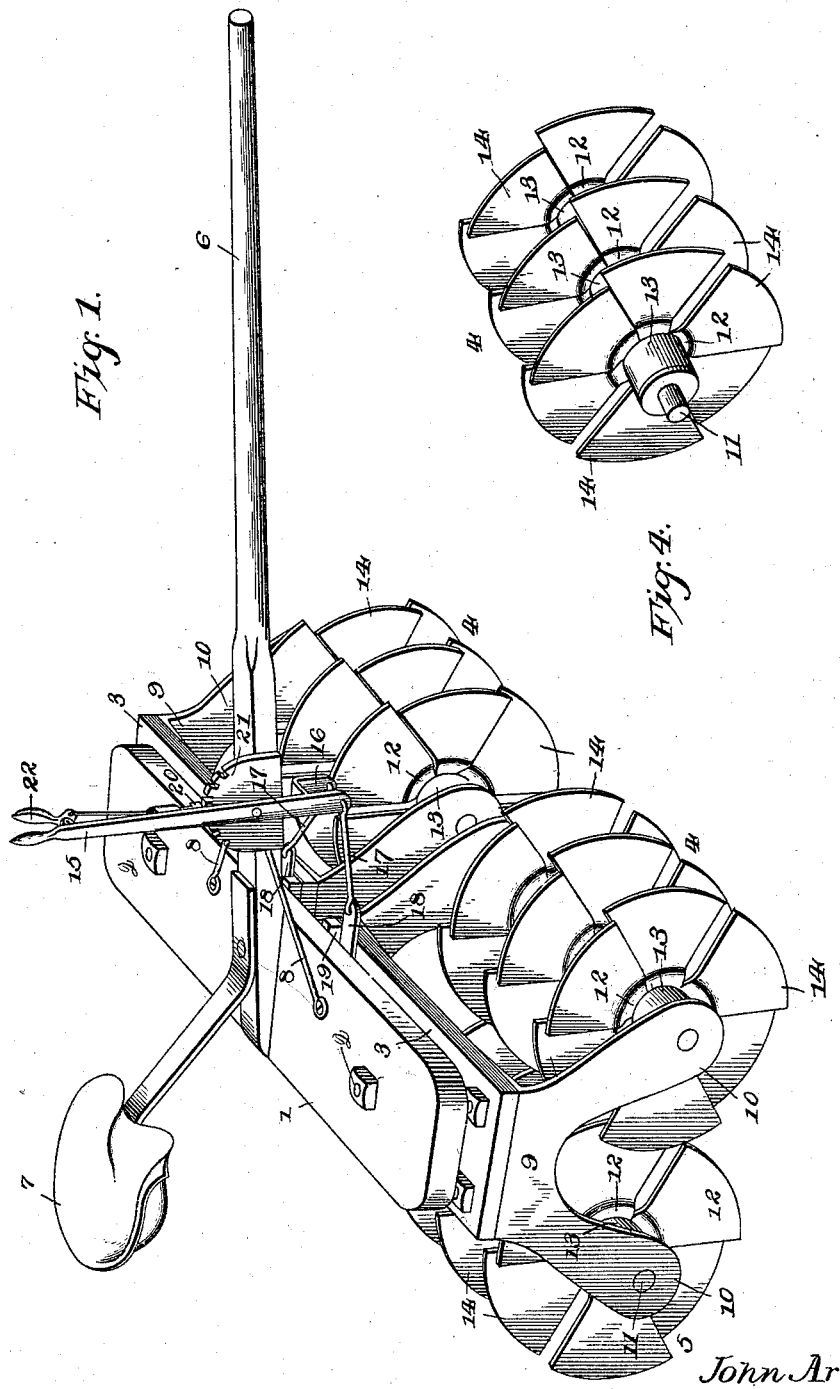
Figure 2:
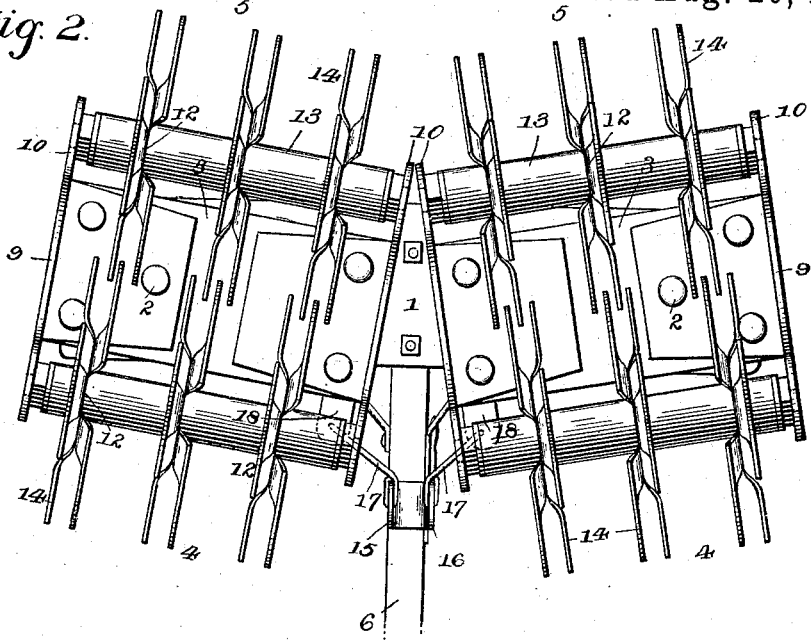
Figure 3:
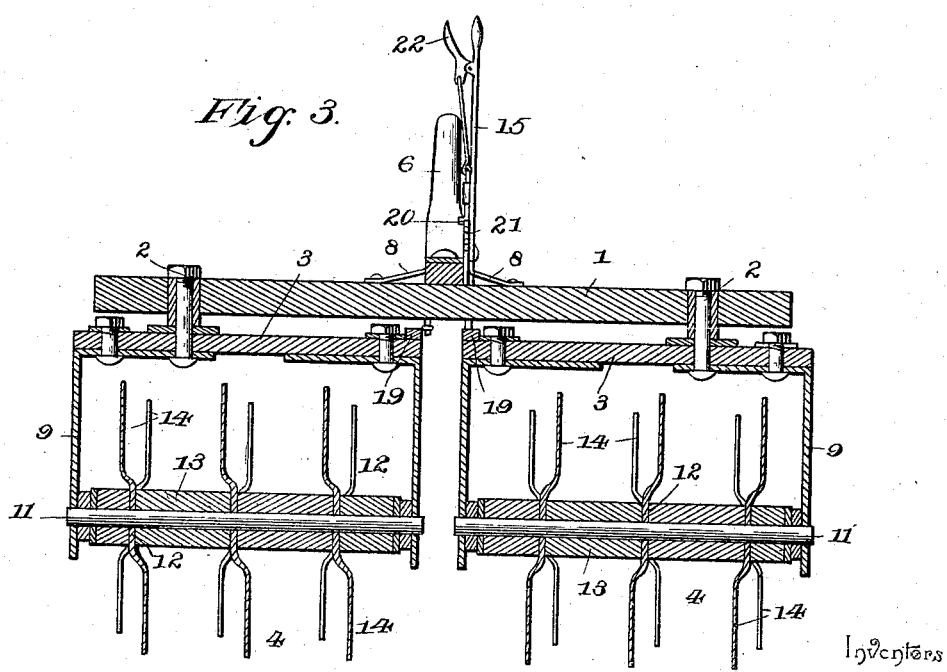

In the drawings, Figure 1 is a perspective view of a harrow constructed in accordance with this invention. Fig. 2 is a reverse plan view of the same. Fig. 3 is a transverse sectional view. Fig. 4 is a detail perspective view of one of the gangs of rotative soil-working devices.

Like numerals of reference indicate corresponding parts in all the figures of the drawings.

1 designates a main frame, to which are connected by vertical pivots 2 horizontally-swinging pivoted frames 3, each carrying a pair of front and rear gangs 4 and 5 of rotative soil-working devices. The main frame has secured to it the rear end of a draft-pole 6, and is surmounted by a seat 7 for the accommodation of the driver, and it is supported by opposite angularly-disposed braces 8, diverging rearward from the tongue. Each frame 3 is preferably pivoted near its outer end to enable the gangs of rotative soil-working devices to be readily adjusted and arranged at the desired angle to the line of draft, and it consists of a top portion and depending hangers 9, composed of oppositely-inclined forward and rearward extending arms 10, having journaled on their lower ends the gang-axles 11.

Each gang of the harrow consists of a series of rotating soil-working devices 12, each device being composed of two sets of sector-shaped blades arranged in two annular series disposed in parallel planes, the blades 14 of one set or annular series of each device 12 being located opposite the spaces between the other set of blades of the same device, whereby each device 12 is provided with alternately-arranged soil-working surfaces adapted to operate thoroughly on the soil and to pulverize the same finely. The sector-shaped blades 14 of each disk or device 12 are preferably constructed of a single piece or disk of metal having radial slits to form the substantially sector-shaped blades 14, which are alternately laterally offset in opposite directions, and the disks or devices 12 of each gang are spaced by blocks or sleeves 13, arranged on the gang-axle 11.

The straight radial splits form flat sector-shaped blades, which are laterally offset at the center of the disk to form two sets of blades arranged in parallel planes, and by locating the disks so that one set of blades of one of them will be between the two sets of the other disk the devices will be self-cleaning.

The gangs of each pivoted frame are arranged in pairs and are located sufficiently close to each other that the blades of one gang pass between the offset blades of each disk, whereby all adhering substances will be automatically removed and the harrow will be effectually prevented from being clogged.

By having the blades of the soil-working devices of one gang operating between those of the adjacent gang it will be apparent that the soil is thoroughly operated on and finely divided.

The pivoted frames are adjusted to set the rotative soil-working device at the desired angle to the line of draft by means of an operating-lever 15, fulcrumed on the draft-pole and having a forked lower portion formed by a laterally-offset arm 16, which is secured to the inner face of the lever and which depends below the draft-pole. The sides of the forked lower portion of the operating-lever are connected by link-rods 17 with forwardly-extending plates 18, secured by bolts or other fastening devices to the upper faces of the top portions of the pivoted frames, at the inner ends thereof, and arranged adjacent to upwardly-extending end flanges 19, located at the inner edges of the pivoted frames. By swinging the upper portion of the operating-lever rearward the gangs are set at an opposite angle, their inner ends being thrown forward. They may be readily adjusted to an opposite position by a reverse movement of the operating-lever, and they are secured in their adjustment by a detent 20, mounted on the operating-lever and engaging a ratchet 21 of the pole and operated by a latch-lever 22.

It will be seen that the harrow is simple and comparatively inexpensive in construction, that it is capable of effectually crushing clods and pulverizing soil, and that the rotative soil-working devices may be readily adjusted to the desired angle to the line of draft. It will also be apparent that by the particular construction and arrangement of the rotative soil-working devices all adhesive substances will be removed and the harrow automatically prevented from being clogged.

Changes in the form, proportion, and the minor details of construction may be resorted to without departing from the principle or sacrificing any of the advantages of this invention.

What we claim is—

A rotative soil working device for harrows, provided with sector-shaped blades, alternately laterally offset in opposite directions and forming two sets of blades arranged in vertical parallel planes, the blades of one set being disposed opposite the spaces between the blades of the other set, whereby alternately arranged soil working surfaces are provided, substantially as described.

In testimony that we claim the foregoing as our own we have hereto affixed our signatures in the presence of two witnesses.

JOHN ARCHER.
NEREUS M. FRAZIER.

Witnesses:
GEORGE W. LONGMIRE,
WILSON L. DALTON.